(12) United States Patent
Bocchino (10) Patent No.: US 11,496,438 B1
(45) Date of Patent: Nov. 8, 2022

(54) METHODS FOR IMPROVED NETWORK SECURITY USING ASYMMETRIC TRAFFIC DELIVERY AND DEVICES THEREOF

(71) Applicant: F5 Networks, Inc., Seattle, WA (US)

(72) Inventor: Kenneth Bocchino, Seattle, WA (US)

(73) Assignee: F5, Inc., Seattle, WA (US)

( * ) Notice: Subject to any disclaimer, the term of this patent is extended or adjusted under 35 U.S.C. 154(b) by 549 days.

(21) Appl. No.: 15/721,149

(22) Filed: Sep. 29, 2017

Related U.S. Application Data (60) Provisional application No. 62/455,917, filed on Feb. 7, 2017.

(51) Int. Cl.
  *H04L 61/2503* (2022.01)
  *H04L 61/5007* (2022.01)
  *H04L 67/01* (2022.01)
  *H04L 101/659* (2022.01)

(52) U.S. Cl.
  CPC ...... *H04L 61/2542* (2013.01); *H04L 61/5007* (2022.05); *H04L 67/01* (2022.05); *H04L 2101/659* (2022.05)

(58) Field of Classification Search
  CPC ............. H04L 29/12339; H04L 61/251; H04L 69/167; H04L 61/2542; H04L 61/5007; H04L 67/01; H04L 2101/659
  See application file for complete search history.

(56) References Cited

U.S. PATENT DOCUMENTS

| 3,950,735 A | 4/1976 | Patel |
| 4,644,532 A | 2/1987 | George et al. |
| 4,897,781 A | 1/1990 | Chang et al. |

(Continued)

FOREIGN PATENT DOCUMENTS

| EP | 0744850 A2 | 11/1996 |
| WO | WO 91/14326 | 9/1991 |

(Continued)

OTHER PUBLICATIONS

"A Process for Selective Routing of Servlet Content to Transcoding Modules," Research Disclosure 422124, Jun. 1999, pp. 889-890, IBM Corporation.

(Continued)

*Primary Examiner* — Jeong S Park
(74) *Attorney, Agent, or Firm* — Troutman Pepper Hamilton Sanders LLP (Rochester)

(57) ABSTRACT

Methods, non-transitory computer readable media, application delivery controller (ADC) apparatuses, and network traffic management systems that receive a request including an Internet Protocol (IP) version 6 (IPv6) source address and an IPv6 destination address. A client IP version 4 (IPv4) address of a client from which the request originated and a server IPv4 address of a server are determined from one or more extracted portions of one or more of the IPv6 source address or the IPv6 destination address. The request is modified to include an IPv4 source address and an IPv4 destination address. The IPv4 source address and the IPv4 destination address include the client IPv4 address and the server IPv4 address, respectively. The modified request is sent to the server based on the server IPv4 address included in the IPv4 destination address of the modified request.

20 Claims, 5 Drawing Sheets (56) References Cited

U.S. PATENT DOCUMENTS

| | | |
|---|---|---|
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,085,320 A | 7/2000 | Kaliski, Jr. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,223,287 B1 | 4/2001 | Douglas et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,535,912 B1 | 3/2003 | Anupam et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,552,199 B2 | 6/2009 | Pomerantz |
| 7,558,197 B1 | 7/2009 | Sindhu et al. |
| 7,624,424 B2 | 11/2009 | Morita et al. |
| 7,757,278 B2 | 7/2010 | Boneh et al. |
| 7,788,730 B2 | 8/2010 | Dean et al. |
| 7,801,978 B1 | 9/2010 | Susai et al. |
| 7,857,002 B2 | 12/2010 | Reck |
| 7,916,728 B1 | 3/2011 | Mimms |
| 7,945,563 B2 | 5/2011 | Seltz |
| 7,966,553 B2 | 6/2011 | Iverson |
| 8,031,716 B2 | 10/2011 | Tsuchiya et al. |
| 8,090,816 B1 | 1/2012 | Deshmukh et al. |
| 8,103,809 B1 | 1/2012 | Michels et al. |
| 8,112,491 B1 | 2/2012 | Michels et al. |
| 8,112,799 B1 | 2/2012 | Loidice et al. |
| 8,130,650 B2 | 3/2012 | Allen, Jr. et al. |
| 8,234,687 B2 | 7/2012 | Baumhof |
| 8,291,497 B1 | 10/2012 | Griffin et al. |
| 8,301,837 B1 | 10/2012 | Natarajan |
| 8,306,036 B1 | 11/2012 | Bollay |
| 8,346,993 B2 | 1/2013 | Michels et al. |
| 8,347,100 B1 | 1/2013 | Thornewell et al. |
| 8,356,352 B1 | 1/2013 | Wawda et al. |
| 8,447,884 B1 | 5/2013 | Baumann |
| 8,537,825 B1 | 9/2013 | Mimms |
| 8,554,999 B2 | 10/2013 | Natarajan |
| 8,578,482 B1 | 11/2013 | Yang et al. |
| 8,582,599 B2 | 11/2013 | Hamamoto et al. |
| 8,584,233 B1 | 11/2013 | Yang et al. |
| 8,601,161 B2 | 12/2013 | Takeda et al. |
| 8,601,586 B1 | 12/2013 | Boutros et al. |
| 8,769,681 B1 | 7/2014 | Michels et al. |

(56) References Cited

U.S. PATENT DOCUMENTS

| | | |
|---|---|---|
| 8,776,166 B1 | 7/2014 | Erickson et al. |
| 8,856,898 B1 | 10/2014 | Thomewell et al. |
| 8,880,632 B1 | 11/2014 | Michels |
| 8,880,696 B1 | 11/2014 | Michels |
| 8,886,981 B1 | 11/2014 | Baumann et al. |
| 8,984,178 B2 | 3/2015 | Michels et al. |
| 9,020,912 B1 | 4/2015 | Majee et al. |
| 9,083,760 B1 | 7/2015 | Hughes et al. |
| 9,106,699 B2 | 8/2015 | Thomewell et al. |
| 9,141,625 B1 | 9/2015 | Thomewell et al. |
| 9,154,453 B2 | 10/2015 | Michels et al. |
| 9,197,667 B2 | 11/2015 | Lyon |
| 9,231,879 B1 | 1/2016 | Wojcik |
| 9,246,819 B1 | 1/2016 | Thirasuttakom |
| 9,294,502 B1 | 3/2016 | Benishti |
| 9,313,047 B2 | 4/2016 | Michels et al. |
| 9,444,839 B1 | 9/2016 | Faulkner et al. |
| 9,674,144 B1 | 6/2017 | Lyon |
| 2001/0023442 A1 | 9/2001 | Masters |
| 2002/0059428 A1 | 5/2002 | Susai et al. |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0086415 A1 | 5/2003 | Bernhard et al. |
| 2003/0108052 A1 | 6/2003 | Inoue et al. |
| 2003/0110379 A1* | 6/2003 | Ylonen ............ H04L 63/0245 726/26 |
| 2003/0145062 A1 | 7/2003 | Sharma et al. |
| 2003/0208562 A1 | 11/2003 | Hauck et al. |
| 2003/0225485 A1 | 12/2003 | Fritz et al. |
| 2004/0190549 A1* | 9/2004 | Huitema ............ H04L 69/16 370/466 |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0144441 A1 | 6/2005 | Govindarajan |
| 2005/0154837 A1 | 7/2005 | Keohane et al. |
| 2005/0187866 A1 | 8/2005 | Lee |
| 2005/0188051 A1 | 8/2005 | Sneh |
| 2006/0005017 A1 | 1/2006 | Black et al. |
| 2006/0059267 A1 | 3/2006 | Cugi et al. |
| 2006/0075028 A1 | 4/2006 | Zager et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2006/0253581 A1 | 11/2006 | Dixon et al. |
| 2006/0259967 A1 | 11/2006 | Thomas et al. |
| 2007/0005984 A1 | 1/2007 | Florencio et al. |
| 2007/0016662 A1 | 1/2007 | Desai et al. |
| 2007/0016949 A1 | 1/2007 | Dunagan et al. |
| 2007/0039038 A1 | 2/2007 | Goodman et al. |
| 2007/0039050 A1 | 2/2007 | Aksenov et al. |
| 2007/0064661 A1 | 3/2007 | Sood et al. |
| 2007/0074169 A1 | 3/2007 | Chess et al. |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0143851 A1 | 6/2007 | Nicodemus et al. |
| 2007/0156592 A1 | 7/2007 | Henderson |
| 2007/0169191 A1 | 7/2007 | Greene et al. |
| 2007/0174491 A1 | 7/2007 | Still et al. |
| 2007/0255953 A1 | 11/2007 | Peyret |
| 2007/0297551 A1 | 12/2007 | Choi |
| 2008/0010377 A1 | 1/2008 | Nissennboim |
| 2008/0034136 A1 | 2/2008 | Ulenas |
| 2008/0092242 A1 | 4/2008 | Rowley |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0201599 A1 | 8/2008 | Ferraiolo et al. |
| 2008/0208957 A1 | 8/2008 | Ding et al. |
| 2008/0229427 A1 | 9/2008 | Ramirez |
| 2008/0244724 A1 | 10/2008 | Choe |
| 2008/0256224 A1 | 10/2008 | Kaji et al. |
| 2008/0281983 A1 | 11/2008 | Cooley et al. |
| 2008/0289047 A1 | 11/2008 | Benea et al. |
| 2008/0301760 A1 | 12/2008 | Lim |
| 2008/0320567 A1 | 12/2008 | Shulman et al. |
| 2009/0049230 A1 | 2/2009 | Pandya |
| 2009/0064337 A1 | 3/2009 | Chien |
| 2009/0077383 A1 | 3/2009 | de Monseignat et al. |
| 2009/0119769 A1 | 5/2009 | Ross et al. |
| 2009/0125625 A1 | 5/2009 | Shim et al. |
| 2009/0138749 A1 | 5/2009 | Moll et al. |
| 2009/0138937 A1 | 5/2009 | Erlingsson et al. |
| 2009/0141891 A1 | 6/2009 | Boyen et al. |
| 2009/0172396 A1 | 7/2009 | Gabel et al. |
| 2009/0182818 A1 | 7/2009 | Krywaniuk |
| 2009/0228956 A1 | 9/2009 | He et al. |
| 2009/0287935 A1 | 11/2009 | Aull et al. |
| 2009/0300749 A1 | 12/2009 | Liske |
| 2009/0304026 A1* | 12/2009 | Hamada ............ H04L 61/251 370/466 |
| 2009/0319769 A1 | 12/2009 | Betouin et al. |
| 2010/0017880 A1 | 1/2010 | Masood |
| 2010/0023582 A1 | 1/2010 | Pedersen et al. |
| 2010/0036820 A1* | 2/2010 | Stergiou ............ H04L 45/745 707/E17.014 |
| 2010/0100725 A1 | 4/2010 | Ozzie et al. |
| 2010/0106767 A1 | 4/2010 | Livshits et al. |
| 2010/0107247 A1 | 4/2010 | Shani |
| 2010/0122091 A1 | 5/2010 | Huang et al. |
| 2010/0150154 A1 | 6/2010 | Viger et al. |
| 2010/0229223 A1 | 9/2010 | Shepard et al. |
| 2010/0251330 A1 | 9/2010 | Kroeselberg et al. |
| 2010/0257354 A1 | 10/2010 | Johnston et al. |
| 2010/0275014 A1 | 10/2010 | Kelley |
| 2010/0275024 A1 | 10/2010 | Abdulhayoglu |
| 2010/0281536 A1 | 11/2010 | Richards et al. |
| 2010/0281563 A1 | 11/2010 | Richards et al. |
| 2010/0313266 A1 | 12/2010 | Feng |
| 2010/0325277 A1 | 12/2010 | Muthiah et al. |
| 2010/0333167 A1 | 12/2010 | Luo et al. |
| 2011/0047620 A1 | 2/2011 | Mahaffey et al. |
| 2011/0066718 A1 | 3/2011 | Susai et al. |
| 2011/0173295 A1 | 7/2011 | Bakke et al. |
| 2011/0282997 A1 | 11/2011 | Prince |
| 2011/0321122 A1 | 12/2011 | Mwangi et al. |
| 2012/0174196 A1 | 7/2012 | Bhogavilli |
| 2013/0212240 A1 | 8/2013 | Thornewell et al. |
| 2014/0245421 A1* | 8/2014 | Lyon ............ H04L 63/1416 726/11 |
| 2014/0304417 A1* | 10/2014 | Fleury ............ H04L 65/1069 709/227 |
| 2015/0052252 A1 | 2/2015 | Gilde et al. |
| 2015/0096020 A1 | 4/2015 | Adams |
| 2015/0121060 A1 | 4/2015 | Mimms et al. |
| 2016/0241590 A1* | 8/2016 | Smith ............ H04L 67/1001 |
| 2017/0078243 A1* | 3/2017 | Backman ............ H04W 8/26 |
| 2017/0237767 A1* | 8/2017 | George ............ H04L 63/1458 726/23 |
| 2018/0124090 A1* | 5/2018 | Koren ............ H04L 63/1416 |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

(56) References Cited

FOREIGN PATENT DOCUMENTS

WO          2014131048 A1       8/2014
WO       WO-2015173287 A1 *   11/2015    ........... H04L 61/251

OTHER PUBLICATIONS

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.
"Servlet/Applet/HTML authentication process with single sign-on," Research Disclosure 429128, Jan. 2000, pp. 163-164, IBM Corporation.
"Traffic Surges; Surge Queue; Netscaler Defense," 2005, PowerPoint Presentation, slides 1-12, Citrix Systems, Inc.
"Windows Server 2003 Kerberos Extensions," Microsoft TechNet, 2003 (Updated Jul. 31, 2004), http://technet.microsoft.com/en-us/library/cc738207, Microsoft Corporation.
Abad, Cristina L., and Rafael I. Bonilla. "An analuysis on the schemes for detecting and preventing ARP cache poisoning attacks." Distributed Computing System Workshops, 2007. ICDCSW'07. 27th International Conference on. IEEE, 2007.
ColonelPanic: Browser plugins vs extension—the difference, retrieved from http://colonelpanic.net/2010/08/browser-plugins-vs-extensions-the-difference.
Crescendo Networks, "Application Layer Processing (ALP)," 2003-2009, pp. 168-186, Chapter 9, CN-5000E/5500E, Foxit Software Company.
Dhamija et al.: "The battle against phishing: dynamic secuirty skinds"—Symposium on Usable Privacy and Security, (SOUPS), Jul. 6-8, 2005, Pittsburgh, PA. USA.
F5 Networks Inc., "Configuration Guide for Local Traffic Management," F5 Networks Inc., Jan. 2006, version 9.2.2, 406 pgs.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176, The Internet Society.
Floyd et al., "Random Early Detection Gateways for Congestion Avoidance," Aug. 1993, pp. 1-22, IEEE/ACM Transactions on Networking, California.
Hochmuth, Phil, "F5, CacheFlow pump up content-delivery lines," Network World Fusion, May 4, 2001, 1 page, Las Vegas, Nevada.
Kevin Borders, Atul Prakash: "Web Tap: detecting covert web traffic"—Proceeding of the 11th ACM conference on Computer and Communications Security CCS'04, pp. 110-120, New York, 2004.
MacVittie, Lori, "Message-Based Load Balancing," Technical Brief, Jan. 2010, pp. 1-9, F5 Networks, Inc.
Mehra et al. Mitigating Denial of Service attack using CAPCHA Mechanism, 2011.
Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
Williams et al., "The Ultimate Windows Server 2003 System Administrator's Guide: Forwarding Authentication," 2003, 2 pages, Figure 10.7, Addison-Wesley Professional, Boston, Massachusetts.
F5 Networks Inc., "BIG-IP® Local Traffic Manager™: Implementations", Manual, May 25, 2016, pp. 1-284, vol. 12.0, F5 Networks, Inc., Retrieved from the Internet:<https://support.f5.com/kb/en-us/products/big-ip_ltm/manuals/product/ltm-implementations-12-0-0.html>.
F5 Networks Inc., "F5 BIG-IP TMOS: Operations Guide", Manual, Mar. 5, 2016, pp. 1-236, F5 Networks, Inc., Retrieved from the Internet:<https://support.f5.com/kb/en-us/products/big-ip_ltm/manuals/product/f5-tmos-operations-guide.html>.
F5 Networks Inc., "BIG-IP® Local Traffic Management: Basics", Manual, Oct. 20, 2015, pp. 1-68, vol. 12.0, F5 Networks, Inc., Retrieved from the Internet:<https://support.f5.com/kb/en-us/products/big-ip_ltm/manuals/product/ltm-basics-12-0-0.html>.
F5 Networks Inc., "BIG-IP LTM and TMOS 12.0.0", Release Notes, Oct. 6, 2016, pp. 1-110, vol. 12.0, F5 Networks, Inc., Retrieved from the Internet:<https://support.f5.com/kb/en-us/products/big-ip_ltm/releasenotes/product/relnote-ltm-12-0-0.html>.

* cited by examiner

METHODS FOR IMPROVED NETWORK SECURITY USING ASYMMETRIC TRAFFIC DELIVERY AND DEVICES THEREOF

This application claims the benefit of U.S. Provisional Patent Application Ser. No. 62/455,917 filed Feb. 7, 2017, which is hereby incorporated by reference in its entirety.

FIELD

This technology generally relates to network security and, more particularly, to methods and devices for facilitating improved network security using scrubbing apparatuses and asymmetric traffic delivery.

BACKGROUND

Network attacks including Distributed Denial of Service (DDoS) attacks are increasing in scale and complexity. On-premises attack prevention devices are often employed by enterprises, but require resources of an enterprise network and do not prevent malicious network traffic from entering the enterprise network. Accordingly, enterprises are increasingly employing cloud-based scrubbing services capable of identifying network attacks in order to prevent such attacks from reaching enterprise networks.

Employing a cloud-based scrubbing service requires routing or steering of network traffic originating from clients to the scrubbing service, from the scrubbing service to servers in an enterprise network, for example, and then asymmetrically to clients from the servers. Currently, Secure Network Address Translation (SNAT) can be utilized to facilitate such traffic routing. However, utilizing SNAT results in losing the true client device address and does not comply with some HyperText Transfer Protocols (HTTPs).

Accordingly, another method referred to as Generic Routing Encapsulation (GRE) tunneling is commonly used to route traffic between a scrubbing service and an enterprise network. With GRE tunnelling, a GRE tunnel is established between a scrubbing service device and a data center edge router, for example, in order to tunnel a request packet received from a client. However, GRE tunneling requires utilization of packet payloads to maintain the tunneled packet, and introduces fragmentation, latency, and connection interruption issues into the traffic flow, which is undesirable.

Moreover, current routing methods, including SNAT, do not prevent attackers from circumventing the scrubbing facility in order to maliciously access servers or other devices in an enterprise network. Accordingly, current asymmetric routing techniques have significant deficiencies and leave enterprise networks susceptible to network attacks.

SUMMARY

A method, implemented by a network traffic management system comprising one or more application delivery controller (ADC) apparatuses, scrubbing apparatuses, client devices, or server devices, includes receiving a request including an Internet Protocol (IP) version 6 (IPv6) source address and an IPv6 destination address. A client IP version 4 (IPv4) address of a client from which the request originated and a server IPv4 address of a server are determined from one or more extracted portions of one or more of the IPv6 source address or the IPv6 destination address. The request is modified to include an IPv4 source address and an IPv4 destination address. The IPv4 source address and the IPv4 destination address include the client IPv4 address and the server IPv4 address, respectively. The modified request is sent to the server based on the server IPv4 address included in the IPv4 destination address of the modified request.

A network traffic management apparatus, comprising memory comprising programmed instructions stored thereon and one or more processors configured to be capable of executing the stored programmed instructions to receive a request including an IPv6 source address and an IPv6 destination address. A client IPv4 address of a client from which the request originated and a server IPv4 address of a server are determined from one or more extracted portions of one or more of the IPv6 source address or the IPv6 destination address. The request is modified to include an IPv4 source address and an IPv4 destination address. The IPv4 source address and the IPv4 destination address include the client IPv4 address and the server IPv4 address, respectively. The modified request is sent to the server based on the server IPv4 address included in the IPv4 destination address of the modified request.

A non-transitory computer readable medium having stored thereon instructions for improved TCP performance comprising executable code which when executed by one or more processors, causes the processors to receive a request including an IPv6 source address and an IPv6 destination address. A client IPv4 address of a client from which the request originated and a server IPv4 address of a server are determined from one or more extracted portions of one or more of the IPv6 source address or the IPv6 destination address. The request is modified to include an IPv4 source address and an IPv4 destination address. The IPv4 source address and the IPv4 destination address include the client IPv4 address and the server IPv4 address, respectively. The modified request is sent to the server based on the server IPv4 address included in the IPv4 destination address of the modified request.

A network traffic management system, comprising one or more application delivery controller (ADC) apparatuses, scrubbing apparatuses, client devices, or server devices, the network traffic management system comprising memory comprising programmed instructions stored thereon and one or more processors configured to be capable of executing the stored programmed instructions to receive a request including an IPv6 source address and an IPv6 destination address. A client IPv4 address of a client from which the request originated and a server IPv4 address of a server are determined from one or more extracted portions of one or more of the IPv6 source address or the IPv6 destination address. The request is modified to include an IPv4 source address and an IPv4 destination address. The IPv4 source address and the IPv4 destination address include the client IPv4 address and the server IPv4 address, respectively. The modified request is sent to the server based on the server IPv4 address included in the IPv4 destination address of the modified request.

This technology has a number of associated advantages including providing methods, non-transitory computer readable media, ADC apparatuses, and network traffic management systems that improve protection of enterprise networks against network attacks. This technology allows enterprises to utilize cloud scrubbing services more efficiently, resulting in improved experiences for clients. This technology also advantageously facilitates asymmetric routing of network traffic without requiring SNAT or GRE tunnels and while preventing circumvention of scrubbing services by malicious actors attempting to access enterprise data centers.

DETAILED DESCRIPTION

Figure 1:
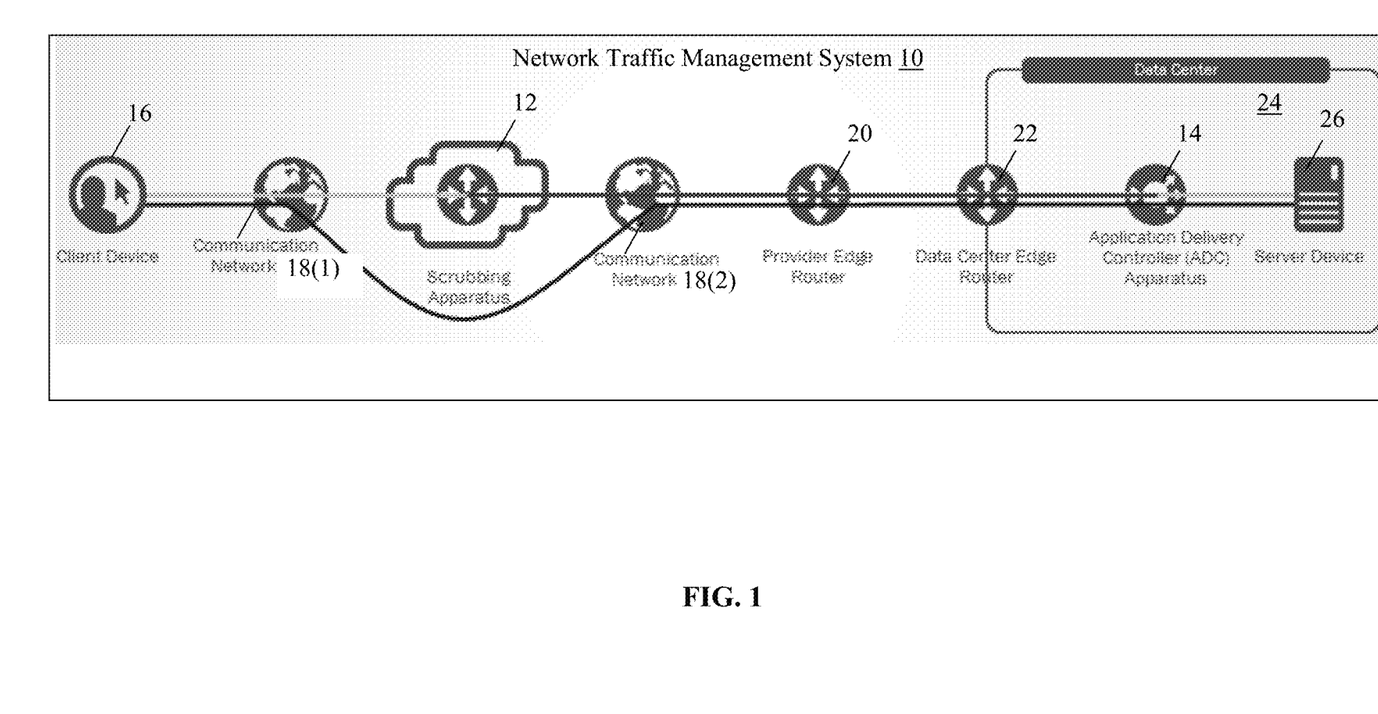
FIG. 1 is a block diagram of an exemplary network traffic management system with an application delivery controller (ADC) apparatus and a scrubbing apparatus.

Referring to FIG. 1, an exemplary network traffic management system 10, which incorporates a scrubbing apparatus 12 and an application delivery controller (ADC) apparatus 14 is illustrated. In this example, the scrubbing apparatus 12 is coupled to a client device 16 by a communication network 18(1) and the ADC apparatus 14 by another communication network 18(2), a provider edge router 20, and a data center edge router 22. The data center edge router 22 is in a data center 24 along with the ADC apparatus 14, which is coupled to a server device 26 also in the data center 24 in this example. The network traffic management system 10 may include other network devices such as one or more other routers and/or switches, for example, which are well known in the art and thus will not be described herein. This technology provides a number of advantages including providing methods, non-transitory computer readable media, ADC apparatuses, and network traffic management systems that utilize a relatively efficient asymmetric traffic delivery via IPv4 client and server addresses embedded in IPv6 source and destination addresses in order to improve network security.

Figure 2:
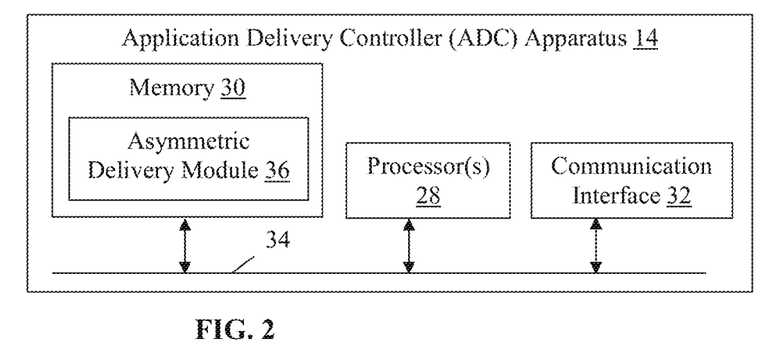
FIG. 2 is a block diagram of an exemplary ADC apparatus.

Referring to FIGS. 1-2, the ADC apparatus 14 of the network traffic management system 10 may perform any number of functions including managing network traffic, accelerating network traffic, and providing security services, for example. The ADC apparatus 14 in this example includes one or more processors 28, a memory 30, and/or a communication interface 32, which are coupled together by a bus 34 or other communication link, although the ADC apparatus 14 can include other types and/or numbers of elements in other configurations.

The processor(s) 28 of the ADC apparatus 14 may execute programmed instructions stored in the memory 30 of the ADC apparatus 14 for the any number of the functions identified above. The processor(s) 28 of the ADC apparatus 14 may include one or more CPUs or general purpose processors with one or more processing cores, for example, although other types of processor(s) can also be used.

The memory 30 of the ADC apparatus 14 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 28, can be used for the memory 30.

Accordingly, the memory 30 of the ADC apparatus 14 can store one or more applications that can include computer executable instructions that, when executed by the ADC apparatus 14, cause the ADC apparatus 14 to perform actions, such as to transmit, receive, or otherwise process messages, for example, and to perform other actions described and illustrated below with reference to FIGS. 4-6. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the ADC apparatus 14 itself, may be located in virtual server(s) running in a cloud-based computing environment rather than being tied to one or more specific physical network computing devices. Also, the application(s) may be running in one or more virtual machines (VMs) executing on the ADC apparatus 14. Additionally, in one or more embodiments of this technology, virtual machine(s) running on the ADC apparatus 14 may be managed or supervised by a hypervisor.

In this particular example, the memory 30 of the ADC apparatus 14 includes an asymmetric delivery module 36 that is configured to extract IP addresses of the client device 16 and the server device 26 from IPv6 source and destination addresses in network traffic received from the scrubbing apparatus 12. Accordingly, the asymmetric delivery module 36 facilitates the receipt of clean or scrubbed request traffic from the scrubbing apparatus 12 and the asymmetric routing of response traffic to the client device 16, as described and illustrated in more detail later with reference to FIGS. 5-6.

The communication interface 32 of the ADC apparatus 14 operatively couples and communicates with the server device 26 and with the scrubbing apparatus 12, via the data center edge router 22, provider edge router 20, and communication network 18(2). By way of example only, the communication network 18(2) can include an Internet Service Provider (ISP) network that uses TCP/IP over Ethernet and industry-standard protocols, although other types and/or numbers of protocols and/or communication networks can be used. The communication network 18(2) in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

While the ADC apparatus 14 is illustrated in this example as including a single device, the ADC apparatus 14 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the ADC apparatus 14.

Additionally, one or more of the devices that together comprise the ADC apparatus 14 in other examples can be standalone devices or integrated with one or more other devices or apparatuses, such as the server device 26, for example. Moreover, one or more of the devices of the ADC apparatus 14 in these examples can be in a same or a different communication network including one or more public, private, or cloud networks, for example.

Figure 3:
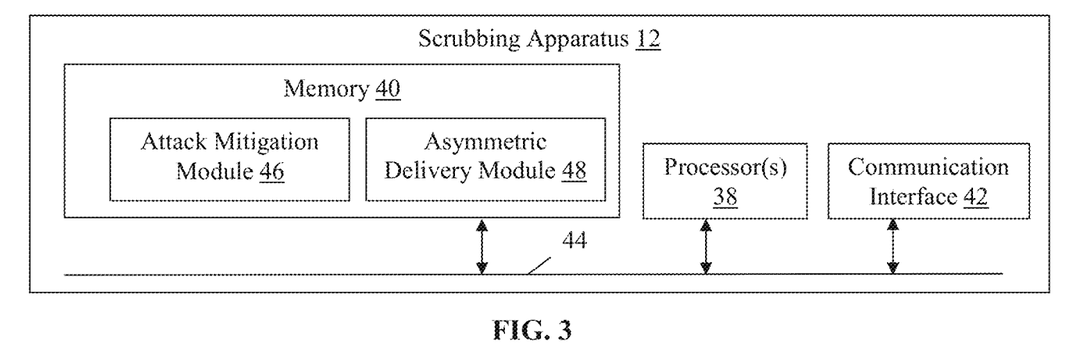
FIG. 3 is a block diagram of an exemplary scrubbing apparatus.

Referring to FIGS. 1 and 3, the scrubbing apparatus 12 may perform any number of functions including managing network traffic and providing security services, for example. The scrubbing apparatus 12 in this example includes one or more processors 38, a memory 40, and/or a communication interface 42, which are coupled together by a bus 44 or other communication link, although the scrubbing apparatus 12 can include other types and/or numbers of elements in other configurations.

The processor(s) 38 of the scrubbing apparatus 12 may execute programmed instructions stored in the memory 40 of the scrubbing apparatus 12 for the any number of the functions identified above. The processor(s) 38 of the scrubbing apparatus 12 may include one or more CPUs or general purpose processors with one or more processing cores, for example, although other types of processor(s) can also be used.

The memory 40 of the scrubbing apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 38, can be used for the memory 40.

Accordingly, the memory 40 of the scrubbing apparatus 12 can store one or more applications that can include computer executable instructions that, when executed by the scrubbing apparatus 12, cause the scrubbing apparatus 12 to perform actions, such as to transmit, receive, or otherwise process messages, for example, and to perform other actions described and illustrated below with reference to FIGS. 4-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the scrubbing apparatus 12 itself, may be located in virtual server(s) running in a cloud-based computing environment rather than being tied to one or more specific physical network computing devices. Also, the application(s) may be running in one or more virtual machines (VMs) executing on the scrubbing apparatus. Additionally, in one or more embodiments of this technology, virtual machine(s) running on the scrubbing apparatus 12 may be managed or supervised by a hypervisor.

In this particular example, the memory 40 of the scrubbing apparatus 12 includes an attack mitigation module 46 and an asymmetric delivery module 48. The attack mitigation module 46 is configured to identify and block malicious network traffic, such as traffic associated with an identified DDoS attack, for example, although the attack mitigation module 46 can be configured to identify and mitigate any number or type of network attack. The attack mitigation module 46 can drop request traffic identified as malicious and forward clean traffic toward the server device 26 via the ADC apparatus 14 thereby improving the network security of the data center.

The routing of the clean network traffic toward the ADC apparatus 14 is facilitated by the asymmetric delivery module 48. Accordingly, the asymmetric delivery module 48 is configured to modify request traffic to embed IPv4 addresses of the client device 16 and the server device 26 into IPv6 source and destination addresses in order to maintain the IPv4 addresses of the client device 16 and the server device 26 for use by the ADC apparatus 14, as described and illustrated in more detail later with reference to FIGS. 4-5.

The communication interface 42 of the scrubbing apparatus 12 operatively couples and communicates with the server device 26 and with the client device 16 via the communication network 18(1) and the ADC device 14 via the communication network 18(2), provider edge router 20, and data center edge router 22. By way of example only, the communication network 18(1) can include the Internet and can use TCP/IP over Ethernet and industry-standard protocols, although other types and/or numbers of protocols and/or communication networks can be used. The communication network 18(2) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the scrubbing apparatus 12 is illustrated in this example as including a single device, the scrubbing apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the scrubbing apparatus 12.

Additionally, one or more of the devices that together comprise the scrubbing apparatus 12 in other examples can be standalone devices or integrated with one or more other devices or apparatuses. Moreover, one or more of the devices of the scrubbing apparatus 12 in these examples can be in a same or a different communication network including one or more public, private, or cloud networks, for example.

The server device 26 in this example includes one or more processors, a memory, and a communication interface, which are coupled together by a bus or other communication link, although other numbers and/or types of network devices could be used. The server device 26 in this example processes requests received from the client device 16 according to the HTTP-based application RFC protocol, for example. Various applications may be operating on the server device and transmitting data (e.g., files or Web pages) to the client devices via the ADC apparatus 14 in response to requests from the client device 16. The server device 26 may be hardware or software or may represent a system with multiple servers in a pool, which may include internal or external networks.

Although the server device 26 is illustrated as a single device, one or more actions of the server device 26 may be distributed across one or more distinct network computing devices that together comprise the server device 26. Moreover, the server device 26 is not limited to a particular configuration. Thus, the server device 26 may contain a plurality of network computing devices that operate using a master/slave approach, whereby one of the network computing devices of the server device 26 operate to manage and/or otherwise coordinate operations of the other network computing devices. The server device 26 may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, the server device 26 can operate within the ADC apparatus 14 itself rather than as a stand-alone server device communicating with the ADC apparatus 14. In this example, the server device 26 operates within the memory 30 of the ADC apparatus 14.

The client device 16 in this example includes any type of computing device that can request and receive web or other network content, such as a mobile computing device, desktop computing device, laptop computing device, tablet computing device, virtual machine (including cloud-based computers), or the like. The client device 16 in this example includes a processor, a memory, and a communication interface, which are coupled together by a bus or other communication link, although other numbers and/or types of network devices could be used.

The client device 16 may run interface applications, such as standard Web browsers or standalone client applications, which may provide an interface to make requests for, and receive content stored on, the server device 26. The client device 16 may further include a display device, such as a display screen or touchscreen, and/or an input device, such as a keyboard for example.

The provider edge router 20 and the data center edge router 22 exchange packets between communication network 18(2) and the ADC apparatus 14 in this example. In other examples, only one edge router can be provided. The provider edge router 20 can be associated with an ISP and the data center edge router 22 can be associated with the enterprise data center network, for example, although other types and number of routers can also be used.

Optionally, one or both of the provider edge router 20 and/or data center edge router 22 includes one or more processors, a memory, and/or a communication interface, which are coupled together by a bus or other communication link, although other numbers and/or types of network devices could be used. In one example, the provider edge router 20 is configured to store an access control list with an IP address of the scrubbing address 12 in order to filter network traffic to prevent circumvention of the scrubbing apparatus 12 and an associated attack on the server device 26, as described and illustrated in more detail later with reference to FIGS. 5-6

Although the exemplary network traffic management system 10 with the scrubbing apparatus 12, ADC apparatus 14, provider edge router 20, data center edge router 22, server device 26, client device 16, and communication networks 18(1) and 18(2) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the scrubbing apparatus 12, ADC apparatus 14, provider edge router 20, data center edge router 22, server device 26, and/or client device 16, for example, may be configured to operate as virtual instances on the same physical machine. In other words, one or more of the scrubbing apparatus 12, ADC apparatus 14, provider edge router 20, data center edge router 22, server device 26, and/or client device 16 may operate on the same physical device rather than as separate devices communicating through communication network(s). Additionally, there may be more or fewer scrubbing apparatuses, ADC apparatuses, edge routers, server devices, and/or client devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of improved network security using asymmetric traffic delivery will now be described with reference to FIGS. 1-6. While the examples described and illustrated herein refer to the HyperText Transfer Protocol (HTTP), this technology is applicable to any Open Systems Interconnection (OSI) model Layer 4 protocol, such as Transmission Control Protocol (TCP), User Datagram Protocol (UDP), or Internet Control Message Protocol (ICMP), as well as any higher level protocol that can operate on the Internet Protocol (IP).

Figure 4:
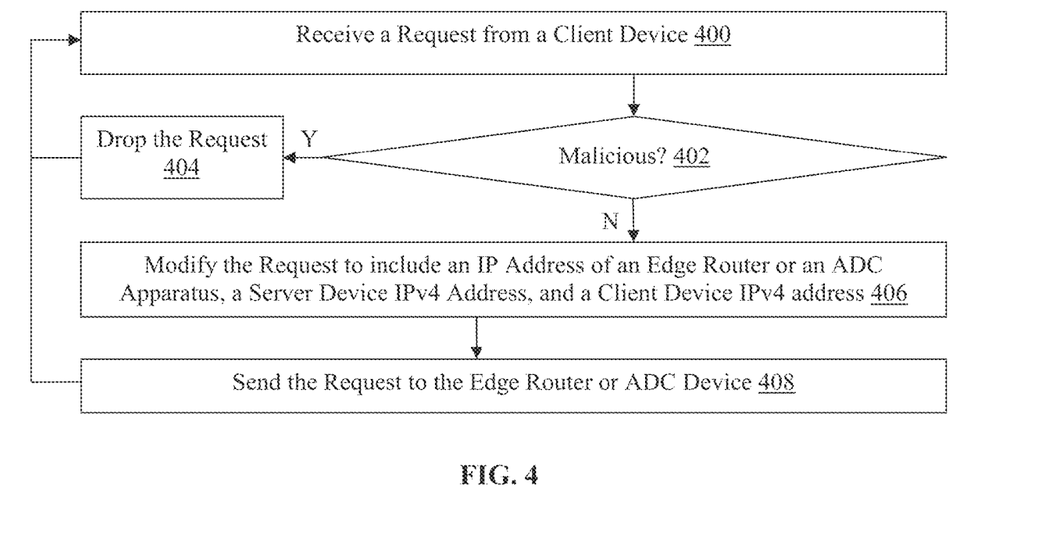
FIG. 4 is a flowchart of an exemplary method for facilitating asymmetric routing with a scrubbing apparatus.

Referring more specifically to FIG. 4, a method for facilitating asymmetric routing with the scrubbing apparatus 12 is illustrated. In step 400 in this example, the scrubbing apparatus 12 receives a request from the client device 16. The request can be for content hosted by the server device 26, for example. In this particular example, the request includes and IP version 4 (IPv4) source address and an IPv4 destination address. The IPv4 source address corresponds with an IPv4 address of the client device 16 and the IPv4 destination address corresponds with an IPv4 address of the server device 26.

Figure 5:
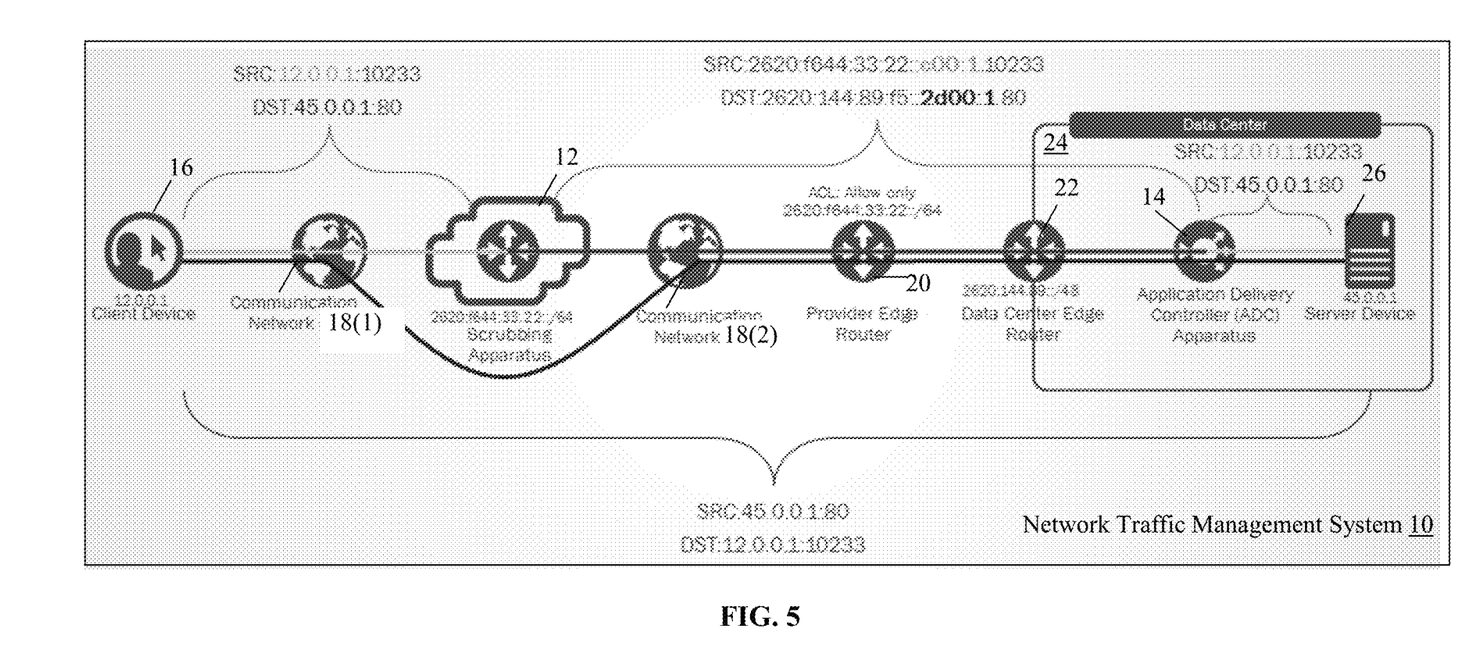
FIG. 5 is a flow diagram illustrating an asymmetrical routing of an exemplary client request and server response.

Referring more specifically to FIG. 5, a flow diagram illustrating an asymmetrical routing of an exemplary client request and server response is illustrated. In this example, the client request includes an IPv4 source address of "12.0.0.1," which corresponds with the IPv4 address of the client device 16. Additionally, the request includes an IPv4 destination address of "45.0.0.1," which corresponds with the IPv4 address of the server device 26. The request is sent by the client device 16 over the communication network 18(1) and is intercepted and received by the scrubbing apparatus 12.

Referring back to FIG. 4, in step 402, the scrubbing apparatus 12 executing the attack mitigation module 46 determines when the request is likely malicious. The determination can be based on any number of factors including the number of request received from the client device 16 within a specific time period or one or more characteristics of the request and/or the client device 16, for example. If the scrubbing apparatus 12 determines that the received request is malicious, then the Yes branch is taken to step 404.

In step 404, the scrubbing apparatus 12 performs a mitigation action, which in this example includes dropping the request, although other types of mitigation actions including rate limiting, redirecting, or sending a challenge to the client device 16 can also be used. However, if the scrubbing apparatus 12 determines in step 402 that the received request is not malicious, then the No branch is taken to step 406.

In step 406, the scrubbing apparatus 12 modifies the request to include an IP address of the data center edge router 22 or the ADC apparatus 14, the server device IPv4 address, and the client device IPv4 address. In this example, the scrubbing apparatus 12 modifies the request to include IPv6 destination address and an IPv6 source address in order to include the IP address of the provider data center edge router 22 or the ADC apparatus 14, the server device IPv4 address, and the client device IPv4 address. In particular, the IPv6 destination address includes an IP address of the data center edge router 22 or the ADC apparatus 14 disposed proximate the server device 26. Additionally, the IPv6 source address includes the client device IPv4 address and, optionally, an IP address of the scrubbing apparatus 12.

Referring back to FIG. 5, the scrubbing apparatus 12 in this example modifies the request to include an IPv6 source address that includes an IP address of the scrubbing apparatus 12, which is "2620:f644:33:22" along with the IPv4 address of the client device 16, which is "c00:1." In this example, "c00:1" is equivalent to the "12.0.0.1" IPv4 address of the client device 16, but is represented in hexadecimal format due to its inclusion in the IPv6 destination address of the modified request and compliance with the IPv6 format.

Additionally, the scrubbing apparatus 12 modifies the request to include an IPv6 destination address that includes an IP address of the data center edge router 22 in this particular example, which is "2620:144:89" along with the IPv4 address of the server device, which is "2d00:1." In this example, "2d00:1" is equivalent to the "45.0.0.1" IPv4 address of the client device 16, but is represented in hexadecimal format due to its inclusion in the IPv6 source address of the modified request and compliance with the IPv6 format.

Referring back to FIG. 4, in step 408, the scrubbing apparatus 12 sends the modified request to the data center edge router 22 or the ADC apparatus 14. The request is sent to the data center edge router 22 or the ADC apparatus 14 based on the IP address for the data center edge router 22 or the ADC apparatus 14 included in the IPv6 destination address of the modified request. Referring again to FIG. 5, the scrubbing apparatus sends the modified request to the data center edge router 22 in this example, although other destinations for the modified request can also be used. The modified request is sent via the communication network 18(2) and the provider edge router 20.

In this particular example, the provider edge router 20 enforces an access control list (ACL) based on the IP address of the scrubbing apparatus 12 such that only network traffic identifying the IP address of the scrubbing apparatus 12 in a source address is allowed to be transmitted to the data center edge router 22. Accordingly, by optionally including the IP address of the scrubbing apparatus 12 in the IPv6 source address of the modified request, and using an ACL, this technology advantageously prevents malicious traffic from circumventing the scrubbing apparatus 12 in order to access the data center 24, and particularly the server device 26.

The provider edge router 20 in this example transmits the modified request to the data center edge router 22, which is in communication with, and transmits the modified request to the ADC apparatus 14, although other paths for the modified request can also be used in other examples. Subsequent to dropping the request in step 404 or sending the modified request in step 408, the scrubbing apparatus 12 proceeds to receive another request in step 400. One or more of steps 402-408 can be performed in parallel for any number of requests received from any number of client devices in other examples.

Figure 6:
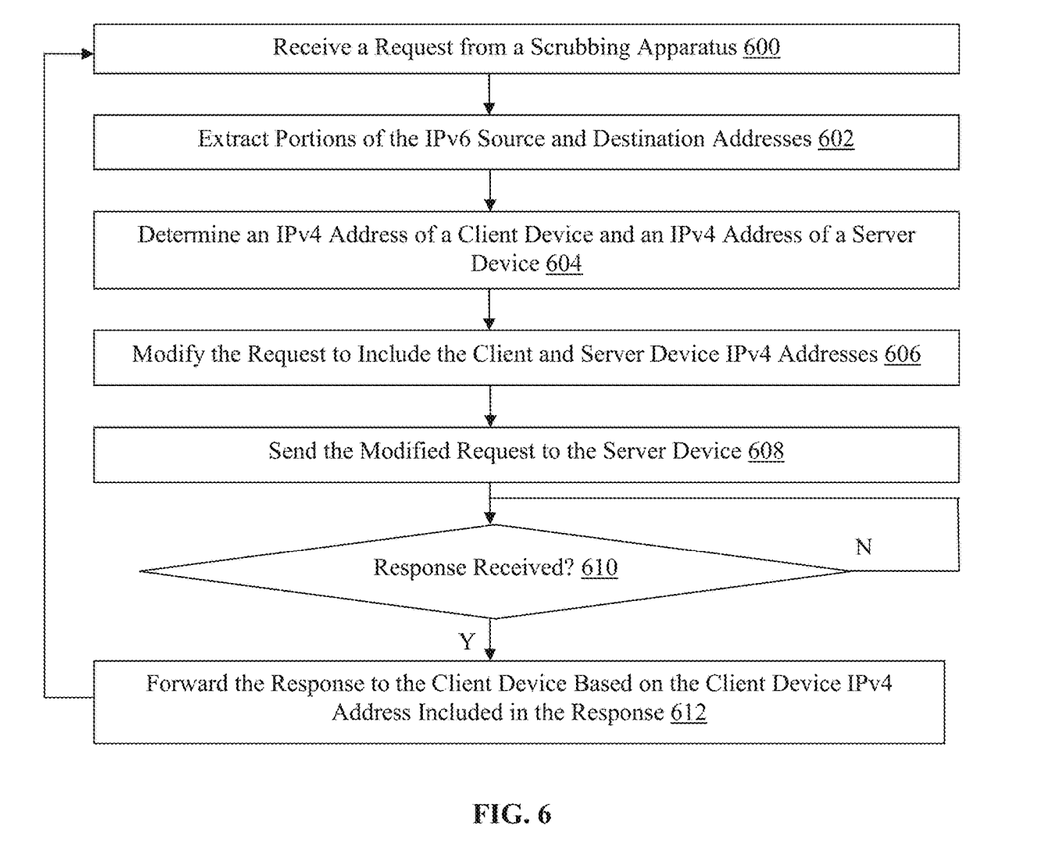
FIG. 6 is a flowchart of an exemplary method for facilitating asymmetric routing with the ADC apparatus.

Referring more specifically to FIG. 6, a method for facilitating asymmetric routing with the ADC apparatus 14 is illustrated. In step 600 in this example, the ADC apparatus 14 receives a request from the scrubbing apparatus 12, such as via the data center edge router 22, provider edge router 20, and communication network 18(2), for example. The received request can be a request that originated with the client device 16, and was modified and sent from the scrubbing apparatus 12, as described and illustrated in more detail earlier with reference to steps 406 and 408 of FIG. 4, for example.

In step 602, the ADC apparatus 14 extracts portions of the IPv6 source and IPv6 destination addresses included in the received request. In this example, the IPv6 source and IPv6 destination addresses include anchor portions followed by IPv4 destination and source mapping portions. The anchor portions of the IPv6 destination and source addresses comprise an IP address of an edge router (e.g., the data center edge router 22) from which the request is received by the ADC apparatus and IP address of the scrubbing apparatus 12 that sent the request to the edge router (e.g., the data center edge router 22), respectively, although other IP addresses can be included in the anchor portions. In this particular example, the extracted portions comprise the IPv4 destination and source mapping portions of the IPv6 source and IPv6 destination addresses.

In step 604, the ADC apparatus 14 determines an IPv4 address of the client device 16 from which the request was originally initiated, and an IPv4 address of the server device 26 from the extracted portions of the IPv6 source and destination addresses. Referring back to the example described and illustrated with reference to FIG. 5, the ADC apparatus 14 receives a modified request with IPv6 source and destination addresses including IPv4 destination and source mapping portions, respectively. The IPv4 destination and source mapping portions include "c00:1" and "2d00:1," which correspond with IPv4 addresses of the client device 16 and the server device 26, respectively.

Accordingly, the ADC apparatus 14 can convert the "c00:1" and "2d00:1" from the IPv6-compliant hexadecimal format into the IPv4 format in order to determine the IPv4 addresses of the client device 16 and server device 26, respectively. In this particular example, the determined client device IPv4 address is "12.0.0.1," which corresponds with "c00:1" in the IPv6-compliant hexadecimal format and the determined server device IPv4 address is "45.0.0.1," which corresponds with "2d00:1" in the IPv6-compliant hexadecimal format.

Referring back to FIG. 6, in step 606, the ADC apparatus 14 modifies the request to include an IPv4 source address and an IPv4 destination address instead of the IPv6 source and destination addresses included in the request as received in step 600. The IPv4 source address and the IPv4 destination address include the client device IPv4 address and the server device IPv4 address, respectively, as determined in step 604. Accordingly, additional mapping space in the IPv6 source and destination addresses is advantageously leveraged with this technology to maintain the IP addresses of the client device 16 and server device 26 without utilizing the payload of the request.

In step 608, the ADC apparatus 16 sends the request as modified in step 606 to the server device 26 based on the server device IPv4 address included in the IPv4 destination address of the modified request. By modifying the request to be in an IPv4-compliant format, and to include the IPv4 address of the client device 16, the ADC apparatus 14 facilitates communication by the server device 26 with the IPv4 client device 16 in an asymmetrical fashion that does not require traversal back through the scrubbing apparatus 12.

In step 610, the ADC apparatus 14 optionally determines when a response to the request sent in step 608 is received from the server device 26. If the ADC apparatus 14 determines that a response is not received, then the ADC apparatus 14 proceeds back to step 610 and effectively waits for a response to the request to be received. However, if the ADC apparatus 14 determines that a response to the request has been received, then the Yes branch is taken to step 610.

In step 612, the ADC apparatus 14 forwards the response to the client device 16 based on the client device IPv4 address included in the response. In this example, the response includes IPv4 source and destination addresses that include the server device IPv4 address and the client device IPv4 address, respectively. In other examples, the server device 26 can communicate the response back to the client device 16 without transmitting the response via the ADC apparatus 14. Subsequent to forwarding the response, the ADC apparatus 14 proceeds back to step 600 and receives another request from the scrubbing apparatus 12. Additionally, one or more of steps 600-612 can be performed by the ADC apparatus 14 in parallel for any number of requests.

With this technology, scrubbing and ADC apparatuses can facilitate asymmetric routing of network traffic without requiring SNAT, which violates some Open Systems Interconnection (OSI) model Layer 4 protocols, such as Transmission Control Protocol (TCP), User Datagram Protocol (UDP), or Internet Control Message Protocol (ICMP), as well as any higher level protocol that can operate on the Internet Protocol (IP), or GRE tunnels, which require use of the payload to carry IP address information and introduce fragmentation and latency. Moreover, circumvention of scrubbing apparatuses by malicious actors in order to access enterprise data centers can advantageously be prevented with this technology. Accordingly, this technology allows enterprises to utilize cloud scrubbing services more efficiently, resulting in improved experience for users of client devices and improved protection of enterprise data centers.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method implemented by a network traffic management system comprising one or more application delivery controller (ADC) apparatuses, scrubbing apparatuses, routers, or server devices, the method comprising:
   receiving a request, from a scrubbing apparatus, formatted in an Internet Protocol (IP) version 6 (IPv6) format and comprising an IPv6 source address and an IPv6 destination address;
   determining whether to forward the request based on the IPv6 source address being within an address space of the scrubbing apparatus;
   extracting a client IP version 4 (IPv4) address of a client and a server IPv4 address of a server from one or more portions of one or more of the IPv6 source address or the IPv6 destination address;
   converting the request from the IPv6 format to an IPv4 format comprising an IPv4 source address and an IPv4 destination address, the IPv4 source address comprising the client IPv4 address; and
   in response to determining the request is to be forwarded based on the IPv6 source address being within the address space of the scrubbing apparatus, sending the converted request in the IPv4 format to the server.

2. The method of claim 1, wherein the client IPv4 address is extracted from one or more portions of the IPv6 source address and the server IPv4 address is extracted from one or more portions of the IPv6 destination address.

3. The method of claim 1, further comprising:
   receiving a response to the converted request from the server, the response formatted in the IPv4 format and comprising another IPv4 destination address comprising the client IPv4 address; and
   forwarding the response formatted in the IPv4 format to the client, wherein the response is forwarded asymmetrically in the IPv4 format in response to the request formatted in the IPv6 format.

4. The method of claim 1, wherein the scrubbing apparatus is an apparatus configured to identify and block network traffic associated with a denial of service attack.

5. The method of claim 1, wherein determining whether the IPv6 source address is within an address space of the scrubbing apparatus comprises determining that an IP address of the scrubbing apparatus is included within an anchor portion of the IPv6 source address.

6. The method of claim 1, wherein the IPv6 formatted request received from the scrubbing apparatus originated as an IPv4 formatted request from the client, and the scrubbing apparatus identified the IPv4 formatted request from the client as not malicious.

7. The method of claim 1, wherein the IPv4 destination address of the converted request in the IPv4 format comprises the server IPv4 address.

8. The method of claim 1, wherein the received response from the server comprises another IPv4 source address comprising the server IPv4 address.

9. An application delivery controller (ADC) apparatus, comprising memory comprising programmed instructions stored thereon and one or more processors configured to be capable of executing the stored programmed instructions to:

receive a request, from a scrubbing apparatus, formatted in an Internet Protocol (IP) version 6 (IPv6) format and comprising an IPv6 source address and an IPv6 destination address;

determine whether to forward the request based on the IPv6 source address being within an address space of the scrubbing apparatus;

extract a client IP version 4 (IPv4) address of a client and a server IPv4 address of a server from one or more portions of one or more of the IPv6 source address or the IPv6 destination address;

convert the request from the IPv6 format to an IPv4 format comprising an IPv4 source address and an IPv4 destination address, the IPv4 source address comprising the client IPv4 address; and in response to determining the request is to be forwarded based on the IPv6 source address being within the address space of the scrubbing apparatus, send the converted request in the IPv4 format to the server based on the server.

10. The ADC apparatus of claim 9, wherein the client IPv4 address is extracted from one or more portions of the IPv6 source address and the server IPv4 address is extracted from one or more portions of the IPv6 destination address.

11. The ADC apparatus of claim 9, wherein the one or more processors are further configured to be capable of executing the stored programmed instructions to:

receive a response to the converted request from the server, the response formatted in the IPv4 format and comprising another IPv4 destination address comprising the client IPv4 address; and forward the response formatted in the IPv4 format to the client, wherein the response is forwarded asymmetrically in the IPv4 format in response to the request formatted in the IPv6 format.

12. The ADC apparatus of claim 9, wherein determining whether the IPv6 source address is within an address space of the scrubbing apparatus comprises determining that an IP address of the scrubbing apparatus is included within an anchor portion of the IPv6 source address.

13. A non-transitory computer readable medium having stored thereon instructions comprising executable code which when executed by one or more processors, causes the one or more processors to:

receive a request, from a scrubbing apparatus, formatted in an Internet Protocol (IP) version 6 (IPv6) format and comprising an IPv6 source address and an IPv6 destination address;

determine whether to forward the request based on the IPv6 source address being within an address space of the scrubbing apparatus;

extract a client IP version 4 (IPv4) address of a client and a server IPv4 address of a server from one or more portions of one or more of the IPv6 source address or the IPv6 destination address;

convert the request from the IPv6 format to an IPv4 format comprising an IPv4 source address and an IPv4 destination address, the IPv4 source address comprising the client IPv4 address; and in response to determining the request is to be forwarded based on the IPv6 source address being within the address space of the scrubbing apparatus, send the converted request in the IPv4 format to the server.

14. The non-transitory computer readable medium of claim 13, wherein the client IPv4 address is extracted from one or more portions of the IPv6 source address and the server IPv4 address is extracted from one or more portions of the IPv6 destination address.

15. The non-transitory computer readable medium of claim 13, wherein the executable code when executed by the one or more processors further causes the one or more processors to:

receive a response to the converted request from the server, the response formatted in the IPv4 format and comprising another IPv4 destination address comprising the client IPv4 address; and forward the response formatted in the IPv4 format to the client, wherein the response is forwarded asymmetrically in the IPv4 format in response to the request formatted in the IPv6 format.

16. The non-transitory computer readable medium of claim 13, wherein determining whether the IPv6 source address is within an address space of the scrubbing apparatus comprises determining that an IP address of the scrubbing apparatus is included within an anchor portion of the IPv6 source address.

17. A network traffic management system, comprising one or more application delivery controller (ADC) apparatuses, scrubbing apparatuses, routers, or server devices, the network traffic management system comprising memory comprising programmed instructions stored thereon and one or more processors configured to be capable of executing the stored programmed instructions to:

receive a request, from a scrubbing apparatus, formatted in an Internet Protocol (IP) version 6 (IPv6) format and comprising an IPv6 source address and an IPv6 destination address;

determine whether to forward the request based on the IPv6 source address being within an address space of the scrubbing apparatus;

extract a client IP version 4 (IPv4) address of a client and a server IPv4 address of a server from one or more portions of one or more of the IPv6 source address or the IPv6 destination address;

convert the request from the IPv6 format to an IPv4 format comprising an IPv4 source address and an IPv4 destination address, the IPv4 source address comprising the client IPv4 address; and in response to determining the request is to be forwarded based on the IPv6 source address being within the address space of the scrubbing apparatus, send the converted request in the IPv4 format to the server.

18. The network traffic management system of claim 17, wherein the client IPv4 address is extracted from one or more portions of the IPv6 source address and the server IPv4 address is extracted from one or more portions of the IPv6 destination address.

19. The network traffic management system of claim 17, wherein the one or more processors are further configured to be capable of executing the stored programmed instructions to:

receive a response to the converted request from the server, the response formatted in the IPv4 format and comprising another IPv4 destination address comprising the client IPv4 address; and forward the response formatted in the IPv4 format to the client, wherein the response is forwarded asymmetrically in the IPv4 format in response to the request formatted in the IPv6 format.

20. The network traffic management system of claim 17, wherein determining whether the IPv6 source address is within an address space of the scrubbing apparatus comprises determining that an IP address of the scrubbing apparatus is included within an anchor portion of the IPv6 source address.

\* \* \* \* \*